Patented Aug. 6, 1940

2,210,420

UNITED STATES PATENT OFFICE 2,210,420

PARASITICIDAL OIL SPRAY

Frank F. Lindstaedt, Oakland, Calif.

No Drawing. Application February 10, 1937,
Serial No. 125,121

1 Claim. (Cl. 167—28)

The invention relates to horticultural oil sprays used for exterminating and controlling parasites, such as plant destructive insects, fungi, scales, and the like. This application forms a continuation-in-part of my co-pending application Serial No. 715,179, filed March 12, 1934 and issued as Patent No. 2,110,398, March 8, 1938, and application Serial No. 752,990, filed November 14, 1934.

Parasiticidal horticultural spray compositions of the type to which the present invention is related are commonly of a petroleum oil and water emulsion type although in certain instances of dormant spraying and in compositions used for spraying from an airplane or the like, the water is frequently omitted and the oil used at full strength. In either instance, it is the oil component of the spray composition which operates by suffocation or otherwise to exterminate the parasite, and among other factors the quantity of oil deposited on the plant surface and the persistence of the oil are important in realizing a successful control of the parasites. There is, however, limiting factors in considering the oil deposit, such as the maintenance of spray cost to a reasonably low figure and also the deleterious effect of heavy persistent oil deposits on the plant surfaces. Also the oil, particularly of the lower viscosities, actively penetrates into the pores and vascular system of the plant which is not only apt to injure the plant, but also requires an excessive oil deposit in order to retain a sufficient amount of oil at the plant surface to attack the parasite. In accordance with the present invention, and as a principal object thereof, I have provided a spray composition of the character described which may be readily emulsified with water and will, on being sprayed, cause a proper breaking of the emulsion and an improved deposit of oil on plant surfaces, and will by the inclusion of an improved toxicant and penetration retardant enable a substantial decrease in the oil deposit and yet produce a far more effective insecticide than the hydrocarbon oil used alone and at the same time safeguard the plant life being sprayed against the injurious effects of oil penetration and heavy persistent oil films.

The invention possesses other objects and features of advantage, some of which, with the foregoing, will be set forth in the following description of the preferred form of the invention. It is to be understood, however, that variations in the mode of effecting the invention as explained in the description may be adapted within the scope of the invention as set forth in the claim.

Briefly stated, I have found that the use of a small amount of naphthenic acid in a petroleum mineral oil either with or without other emulsifying agents and the like, produces a spray composition having all of the above characteristics, the naphthenic acid having, among other qualities, the threefold actions of an emulsifier, a toxicant and a penetration retardant. Naphthenic acids when used in small amounts in the oil are substantially entirely harmless for practically all forms of plant life and yet when incorporated in even very small proportions in the order of 0.1% of the mineral oil have a pronounced effect in each of the functions above noted. On the other hand, the proportion of the naphthenic acid may be increased up to around 5% without injury to the more sensitive plants and trees with which the spray composition is used. Ordinarily, however, the range of naphthenic acid need not exceed 2%. The particular use and value of naphthenic acid as a petroleum oil penetration control agent has been referred to in my copending application Serial No. 24,359, entitled "Spray oil penetration control."

As is understood, naphthenic acids are derived principally from petroleum crudes and consist of a family of compounds which are found in, and may be separated from, the different petroleum fractions, the lighter naphthenic acids being present in the lighter petroleum fractions, while the heavier and higher molecular weight naphthenic acids are found in the heavier petroleum fractions. Substantially any of these naphthenic acids are beneficial in providing the functions above enumerated but vary somewhat in their effect. The heavier naphthenic acids, such as obtained from the petroleum lubricating oil fractions are slightly better emulsifying agents and oil penetration retardants than the naphthenic acids obtained from the kerosene, gasoline and lighter petroleum fractions. On the other hand, the naphthenic acids obtained from the lighter petroleum fractions and particularly the kerosene and gasoline range have a very pronounced improved toxicity over the heavier naphthenic acids such as derived from the lubricating oil fractions. This improved toxicity of the lighter naphthenic acids is probably due to the increased acidity of these acids and also due to the activity of these lighter acids in dissolving the waxes and other protective coatings normally on the parasites and in actively penetrating the vascular system of the parasite. The organic acid number of these lighter acids will range from approximately 150 to 250 and upwards when derived from the kerosene and lighter petroleum fractions. On the other hand, the organic acid number of the heavier naphthenic acid, such as derived from the lubricating oil fractions may be as low as 10 to 15 and may not exceed 40. The comparatively lower value of the lighter naphthenic acids as emulsifiers and penetration retardants is, in most instances, secondary to the greater toxicity of these lighter acids and accordingly I prefer to use naphthenic acids derived from kerosene and lighter petroleum fractions. However, in many cases, it is desirable to use a small percentage of the heavier naphthenic acids along with lighter naphthenic acids in order to strengthen the emulsifying and penetration retardant values of the spray composition.

The petroleum oil commonly used in horticultural spray practice and ranging from say, 40 to 100 viscosity (seconds Saybolt) may be used in the present composition and the viscosity of the oil may be varied throughout this range and even to viscosities outside of this range for particular spray conditions, such as where lighter and heavier petroleum oils have been heretofore used in horticultural spray practice. This oil is commonly referred to as a petroleum or mineral oil or a paraffinic mineral oil and is generally refined to a high unsulphonatable residue of 90% or higher so as to insure its safe use on plants. The naphthenic acid is soluble in petroleum mineral oils and in accordance with the present invention, is added thereto to provide what is commonly termed a soluble or self emulsifiable spray oil. This oil, in the ordinary spray practice, is made up without the inclusion of water and is taken to the field and there added to water in a suitable apparatus in proportion ranging from ½ to 5 or 6 per cent oil to the water, and is agitated with the water in the mixing chamber of the spray apparatus to produce a spray emulsion. In some instances where the spray apparatus does not cause a thorough agitation of the mixture and where, by reason of the quality of the water used, emulsification is difficult, I prefer to embody in the spray composition a small percentage of an additional emulsifying agent. A large class of emulsifiers will work satisfactorily with the naphthenic acid in insuring a proper emulsification of the oil. Preferably the emulsifier used is soluble or dispersible in the petroleum oil so as to produce a good emulsion on only a mild agitation of the oil with the water. I have found, and as set forth in my copending applications aforesaid, that a particularly good emulsifier to be used with the naphthenic acid is a sulphonated oil, such as sulphonated castor oil, sulphonated oleic acid, sulphonated naphthenic acid, and the like, or the pre-combination of naphthenic acid itself or other oil acid, with one of said oils. In these cases, a small quantity of naphthenic acid will react with the sulphonated oil and produce a highly beneficial oil soluble emulsifier and the use of an excess of naphthenic acid, as specified in said applications, will not only insure this reaction but also provide a certain quantity of free naphthenic acid. For example, in my copending application, Serial No. 715,159 (Patent No. 2,110,398), I disclose the following oil soluble preparation:

| | Parts |
|---|---|
| Sulphonated castor oil | 2 |
| Naphthenic acid | 1 |
| Corn oil | 1 |

This mixture is preferably heat treated to react the naphthenic acid and castor oil and render the latter soluble in the hydrocarbon oil and when the final product is added at approximately 1½% to the hydrocarbon oil the same forms an efficient emulsifier. Of the 0.375 naphthenic acid used in the 1.5% of the mixture approximately 0.35% of the naphthenic acid remains in free state in the petroleum oil.

Also disclosed in said application is the combination of:

| | Parts |
|---|---|
| Sulphonated oleic acid | 1 |
| Naphthenic acid | 1 |

This combination is also preferably heat treated to react the ingredients and when added to the petroleum oil in proportion of about 1.5%, provides an efficient emulsifier. In this mixture of the 0.75% naphthenic acid used in 1.5% of the mixture in the petroleum oil approximately 0.7% of the naphthenic acid remains in free state.

In my copending application, Serial No. 752,990, I disclose the following oil soluble preparation:

| | Parts |
|---|---|
| Sulphonated naphthenic acid | 1 |
| Naphthenic acid | 2 |

This preparation, as referred to in said application, provides when added to the petroleum oil in proportion of ¼% to 2% an efficient emulsifier and in addition provides an excess of free naphthenic acid which is valuable as a toxicant and oil penetration retardant. The sulphonated naphthenic acid in distinction to the sulphonated castor oil and sulphonated oleic acid is practically in all cases substantially soluble in the petroleum oil in the proportions here used. In this respect various forms of the sulphonated naphthenic acid, such as the alpha, beta and gamma sulphonated naphthenic acids appear to vary in their solubility in the petroleum oil. Certain of these sulphonated naphthenic acids are fully soluble in the petroleum oil in the proportions here used while one or more is less soluble and while at least partially soluble, will tend to cloud or precipitate slightly on standing. Sulphonated naphthenic acids obtained from different refineries will vary somewhat as to solubility (probably due to the different proportions of the alpha, beta and gamma groups) but substantially all are sufficiently soluble, that is, an ample proportion will go into solution in the petroleum oil, to provide an efficient oil soluble emulsifier when used by themselves. In the presence of the naphthenic acid, however, all of these sulphonated naphthenic acids become fully soluble in the petroleum oil, and with the various sulphonated naphthenic acids with which I have used the amount of naphthenic acid required to solubilize the sulphonated naphthenic acid ranges from none at all to approximately 0.1%; the latter being all that is required in practically all instances where there is an excess of naphthenic acid present to insure reaction of approximately 0.1% of the acid. Thus in the combination above where an abundance of naphthenic acid is used, the amount of free naphthenic acid in the petroleum oil will vary from approximately 0.15% to 1.2% depending on the proportion of the preparation used in the above range of ¼% to 2%.

The above mentioned emulsifiers operate admirably well with the present invention in that the naphthenic acid plays a definite part in, and forms an important ingredient of, the emulsifier and is in addition present in very substantial quantities in a free state in the amounts above noted, and in such state and amounts provides the important functions of a toxicant and a penetration control agent, as well as adding further emulsifying power to the preparation. Where desired, greater amounts of naphthenic acid may be added to these mixtures so as to further increase the amount of free naphthenic acid without increasing the amount of the remainder of the emulsifier.

While I prefer to use as an additional emulsifier, one which is composed, in part, of naphthenic acid, the class of oil soluble emulsifiers disclosed in application, Serial No. 715,179 and consisting of the reaction product of a sulphonated oil and an oil acid, cooperate excellently with naphthenic acid in forming the present preparation. Examples of this class of emulsifiers are:

| | Parts |
|---|---|
| Sulphonated castor oil | 1 |
| Coconut acid oil | 1 |
| Sulphonated castor oil | 1 |
| Fish oil | 1 |
| Sulphonated olive oil | 1 |
| Corn oil | 1 |

In addition, I have used, together with the naphthenic acid and petroleum oil, such oil soluble emulsifiers as the various fish oils such as herring oil, bone oil, chaulmugra oil, tung oil, glycerol oleate, aluminum naphthenate, and others. The various emulsifiers mentioned above may be used in the spray composition in various proportions dependent upon their emulsifying power and ranging from approximately 1% to 4% or 5%.

I claim:

A horticultural spray composition comprising, a petroleum oil, and an oil soluble sulphonated naphthenic acid.

FRANK F. LINDSTAEDT.